United States Patent
Kimura et al.

(10) Patent No.: US 8,215,260 B2
(45) Date of Patent: Jul. 10, 2012

(54) ROTARY ELECTRIC MACHINE-MANUFACTURING APPARATUS AND METHOD OF MANUFACTURING THE SAME

(75) Inventors: Hideaki Kimura, Anjo (JP); Yoshiyuki Kawasaki, Anjo (JP); Tooru Kuroyanagi, Anjo (JP); Nobuyuki Asaoka, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 1330 days.

(21) Appl. No.: 10/543,833

(22) PCT Filed: Sep. 10, 2004

(86) PCT No.: PCT/JP2004/013235
§ 371 (c)(1),
(2), (4) Date: Jan. 3, 2006

(87) PCT Pub. No.: WO2005/027320
PCT Pub. Date: Mar. 24, 2005

(65) Prior Publication Data
US 2006/0165879 A1  Jul. 27, 2006

(30) Foreign Application Priority Data

Sep. 10, 2003  (JP) ................................. 2003-318948

(51) Int. Cl.
*B05C 5/02* (2006.01)
*B05D 7/16* (2006.01)

(52) U.S. Cl. ........ 118/317; 118/318; 118/323; 118/304; 427/104; 427/116; 427/425; 427/428.01

(58) Field of Classification Search .................. 118/317, 118/318, 320, 304, 323, DIG. 10, DIG. 11, 118/DIG. 13; 29/596; 242/433.2, 433.3, 242/443, 445.1; 427/104, 116, 425, 428.01
See application file for complete search history.

(56) References Cited

U.S. PATENT DOCUMENTS 2,200,794 A * 5/1940 Krantz ..................... 379/387.01
(Continued)

FOREIGN PATENT DOCUMENTS

DE  197 29 778 A1  1/1999
(Continued)

OTHER PUBLICATIONS

International Search Report for International Application No. PCT/EP2004/001397, European Patent Office, mailed on Jul. 15, 2004.
(Continued)

*Primary Examiner* — Laura Edwards
(74) *Attorney, Agent, or Firm* — Oliff & Berridge PLC

(57) ABSTRACT

A rotary electric machine-manufacturing apparatus utilized to implement a process of infiltrating varnish into wire-wound coils of a rotary electric machine, and of curing the varnish, an apparatus includes a rotator 2 supporting a work S attached with the wire-wound coils Sc and rotating the work; and a high-frequency power supply device supplying electric power to the wire-wound coils. It is thus possible to support and heat up the work without having devices that surround the work S, thereby positioning a varnish dropping-infiltrating device 6 appropriately. Further, there is no need to change a stage as conventional heat-up processes with an oven or a hot blast-circulating furnace did, and an entire process from pre-drying to curing can be implemented at a single stage.

19 Claims, 16 Drawing Sheets

U.S. PATENT DOCUMENTS

| | | | | |
|---|---|---|---|---|
| 3,953,275 | A | * | 4/1976 | Henderson et al. ............ 156/278 |
| 4,559,698 | A | * | 12/1985 | Bair et al. ........................ 29/598 |
| 4,969,414 | A | * | 11/1990 | Bair et al. ...................... 118/668 |
| 4,991,782 | A | * | 2/1991 | Luciani ....................... 242/432.4 |
| 5,919,907 | A | | 7/1999 | Shanbrom |
| 5,990,450 | A | * | 11/1999 | Kirker et al. .................. 219/388 |

FOREIGN PATENT DOCUMENTS

| | | |
|---|---|---|
| DE | 101 11 660 A1 | 9/2002 |
| EP | 0 366 946 A1 | 5/1990 |
| GB | 1 241 416 | 8/1971 |
| JP | A-5-115160 | 5/1993 |
| JP | A 06-327203 | 11/1994 |
| JP | A 07-031108 | 1/1995 |
| JP | A 10-290573 | 10/1998 |

OTHER PUBLICATIONS esp@cenet database, English language abstract for document FP2, De 197 29 778 A1, accessed online at http://v3.espacenet.com/textdoc?DB=EPODOC&IDX=DE19729778&F=0, Dec. 2005.

Partial translation of Japanese Office Action dispatched on Jul. 27, 2010 in Japanese Application No. 2005-513918.

* cited by examiner

F I G. 1
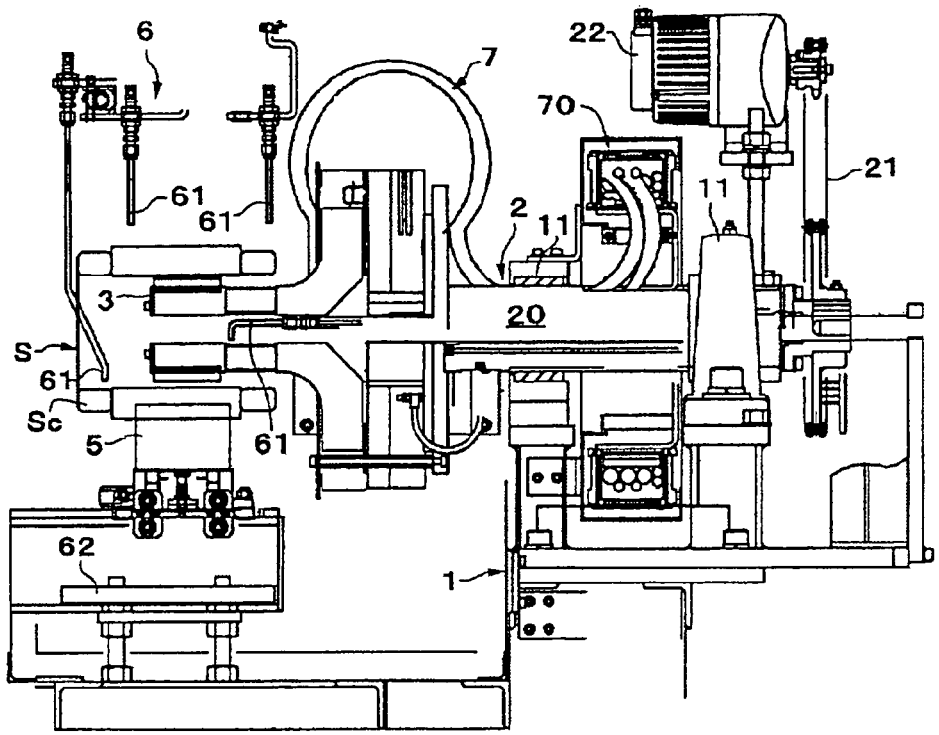
F I G. 2
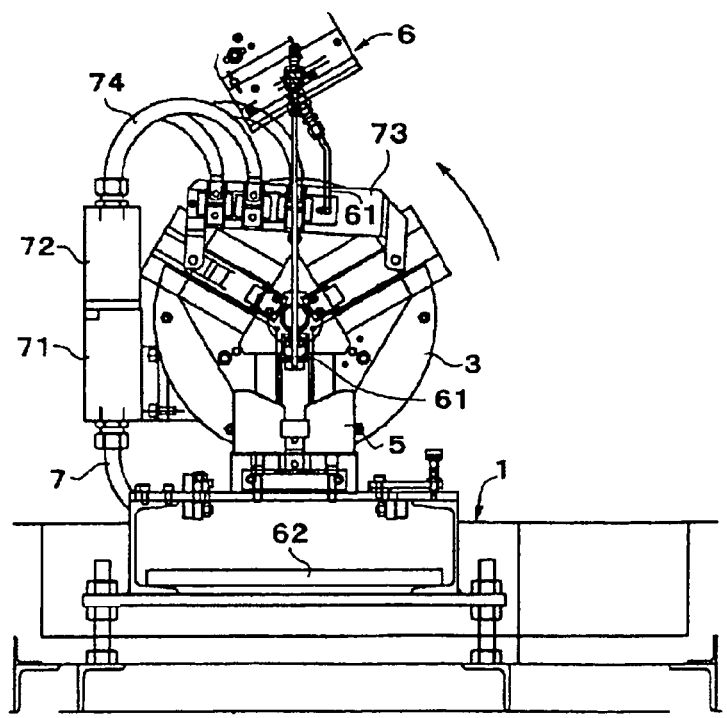

ROTARY ELECTRIC MACHINE-MANUFACTURING APPARATUS AND METHOD OF MANUFACTURING THE SAME

INCORPORATION BY REFERENCE

The disclosure of Japanese Patent Application No. 2003-318948, filed on Sep. 10, 2003 including the specification, drawings and abstract is incorporated herein by reference in its entirety.

BACKGROUND

The disclosure relates to an apparatus and a method of manufacturing a rotary electric machine.

In a process of manufacturing, for example, a stator of a rotary electric machine such as an electric motor and a generator, a varnish-infiltrating process exists by which a varnish is applied to wire-wound coils. The applied varnish is then cured in order to reinforce an insulation of the wire-wound coils that are inserted into slots of the stator, and to enhance anti-vibration characteristics, oil resistance, chemical resistance, and a heat-radiating performance of the wire-wound coils.

In the varnish-infiltrating process, aside from a varnish-dropping process, there are processes for pre-drying, gelating, and curing as processes accompanying a heating process for a pre-processing and for an after-processing. The processes of pre-drying, gelating and curing are illustrated in a processing flowchart in FIG. 17. In the varnish-infiltrating process, a varnish dropping-infiltrating treatment is performed to prevent the varnish from being attached to the inside and the outside of a core. During the dropping-infiltrating treatment, varnish drops onto only coil ends and portions that stand up from slots while a workpiece rotates. Among the processes accompanying the heating process, a pre-drying process removes moisture and modifies a degree of coil stress and a curing process prevents the varnish from weeping by curing or hardening the varnish while the workpiece rotates.

In the processes accompanying the heating process, there exists a method according to which an oven (FIG. 18) or a hot blast-circulating furnace (FIG. 19) is employed. In the heating method involving an oven, as illustrated in FIG. 18, a workpiece (represented by a stator already attached with wire-wound coils) is placed inside the oven and then heated by heated air while the workpiece rotates. Therefore, the heating method is considered a batch type treatment. Further, in the heating method involving a hot blast-circulating furnace, as illustrated in FIG. 19, while the workpiece rotates, the workpiece passes through a tunnel within the furnace while being heated by heated air. The heating method with a hot blast-circulating furnace is different from the heating method with an oven. By utilizing the hot blast-circulating furnace, it is possible to perform continuous processing.

SUMMARY

However with the conventional varnish-infiltrating processes, the following issues still remain:

(1) An oven or a hot blast-circulating furnace is used to perform a heat treatment such as pre-drying and curing. During the heat treatment, heat emanating from a heater heats a workpiece after heating the inside of the oven, or the inside of the hot blast-circulating furnace. Therefore, a long period of time is required to heat the inside of the oven or the hot blast circulating furnace within a degree of certainty in order to accurately heat the insides of the coil ends and the insides of slots, which all correspond to deep portions of the workpiece. Such a pre-drying process takes a considerable period of time (1.5 to 2 hours). Such a curing process takes also takes a considerable period of time (1.5 to 3 hours). A total amount of time for performing an entire process thus amounts to 3.5 to 6 hours. Moreover, it is necessary to move the workpiece at every process step of the varnish-infiltrating process, thereby impairing work efficiency.

(2) Throughout the entire varnish-infiltrating process, a workpiece is put into and taken out of an oven or a hot blast-circulating furnace, before and after processes connected with heating a workpiece, such as from pre-drying to cooling, from a varnish dropping to curing and from curing to cooling. A jig, a device, and operating time are accordingly all are also required for putting the workpiece into and taking out of the oven or the furnace. Inefficient operations are thus performed.

(3) As illustrated in FIG. 20, at a time when the varnish is dropped, the varnish is initially applied to a workpiece that has been maintained at a level temperature, at which a degree of varnish viscosity (depicted by a solid line in FIG. 20) can be reduced to a minimum. However, when the heat from the workpiece (depicted by a broken line in FIG. 20) is absorbed by the varnish in response to the varnish dropping, the temperature of the workpiece drops from a high temperature to a low temperature during the passage of time between the starting and finishing times of the varnish-dropping. Simultaneously with these variations in temperature, the degree of varnish viscosity increases from a low level to a high level, and in response to the increase in the degree of varnish viscosity, the permeability of the varnish into spaces between magnet wires is impaired. Therefore, varnish is controlled to infiltrate slowly over a period of time (approximately 0.5 hours to 1 hour).

(4) Conventionally, a method has been suggested by which varnish permeates while electric current is being supplied to motor coils (workpiece). However, when varnish is dropping and permeating while electric current is being supplied to a workpiece, if electric supply lines are rotated directly, electric supply lines become twisted or get cut off as a result of being wound around a rotational shaft.

Further, JP-A-07-031108 discloses a process of infiltrating varnish into a rotary electric machine.

The invention thus describes, among other things, a rotary electric machine-manufacturing apparatus and a method of manufacturing a rotary electric machine in which it is possible to rotate a workpiece while electric current is being supplied to the workpiece. It is also possible to enhance working efficiency through a series of processes of infiltrating varnish into wire-wound coils and curing the varnish during manufacturing a rotary electric machine, wherein the workpiece has been set and pre-drying, varnish dropping, and curing can be continuously performed in a short period of time.

According to a first exemplary aspect of the invention, a rotary electric machine-manufacturing apparatus includes a rotator that supports a workpiece attached with wire-wound coils, wherein the rotator rotates the workpiece; a power supply device that supplies electric power to the wire-wound coils; and a varnish-infiltrating device that supplies varnish to the wire-wound coils, wherein electric supply lines that connect the power supply device with the wire-wound coils of the workpiece are linked by a slip ring.

According to a second exemplary aspect of the invention, a rotary electric machine-manufacturing apparatus includes a rotator that supports a workpiece attached with wire-wound coils, wherein the rotator rotates the workpiece; a power supply device that supplies electric power to the wire-wound coils; and a varnish-infiltrating device that supplies varnish to the wire-wound coils, wherein the rotator is a reciprocating rotating device that rotates in a first rotational direction and in an opposite, second rotational direction.

According to a third exemplary aspect of the invention, a method of manufacturing a rotary electric machine, includes supporting a workpiece attached with wire-wound coils; continuously rotating the workpiece in a rotational direction; supplying electric power to the wire-wound coils while the workpiece is being continuously rotated; and supplying varnish to the wire-wound coils while electric power is being supplied to the wire-wound coils.

According to a fourth exemplary aspect of the invention, a method of manufacturing a rotary electric machine, includes supporting a workpiece attached with wire-wound coils; rotating the workpiece reciprocatingly in a first rotational direction and in an opposite, second rotational direction; supplying electric power to the wire-wound coils while the workpiece is being rotated reciprocatingly in the first rotational direction and in the second rotational direction; and supplying varnish to the wire-wound coils while electric power is being supplied to the wire-wound coils.

BRIEF DESCRIPTION OF THE DRAWINGS

Various embodiments of the invention will be described with reference to the drawings, wherein:

FIG. 1 is a partial sectional side view illustrating a rotary electric machine-manufacturing apparatus according to an embodiment of the invention;

FIG. 2 is a front view illustrating the rotary electric machine-manufacturing apparatus as viewed from an axial end;

DETAILED DESCRIPTION OF PREFERRED EMBODIMENTS

Figure 3:
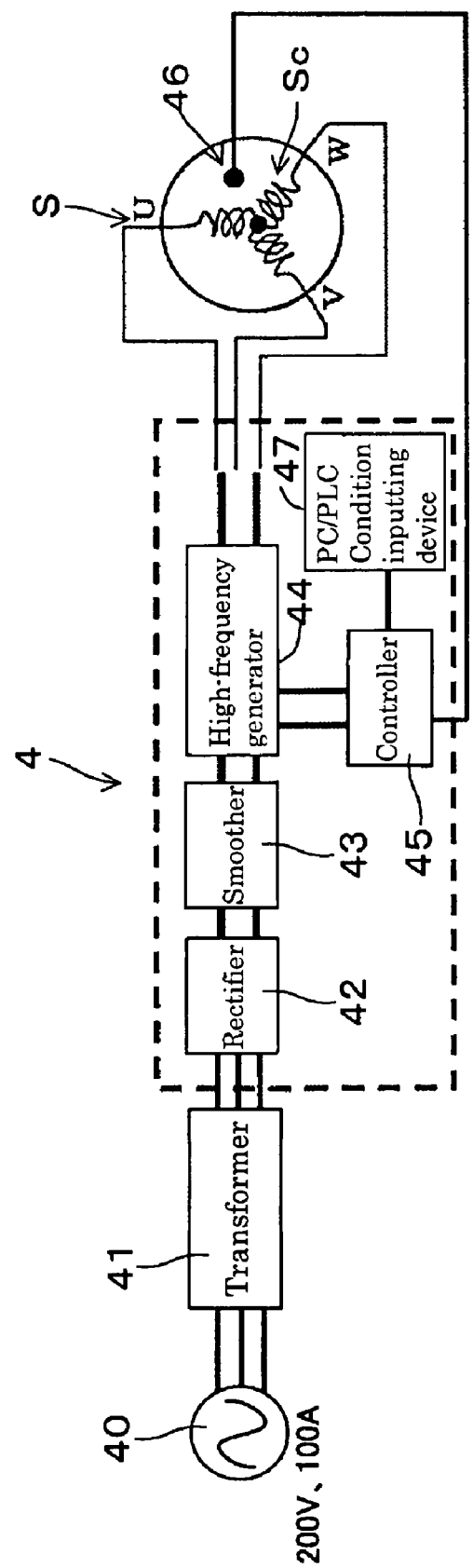
FIG. 3 illustrates a structure of a high-frequency power supply device.

A power supply device, according to the embodiment, supplies high-frequency electric power at a frequency that is higher than a frequency supplied by a commercial power source. Herein, a commercial power source is a source that 1) supplies electric power at a frequency of 50 Hz or 60 Hz, 2) supplies electric power by an electric power supplier, or 3) another electric power source being comparable to the aforementioned source. Moreover, a commercial three-phase type power source, which emanates three-phase electric power for commercial uses, is deemed to fall into the category of such a commercial power source. In this case, by supplying a high-frequency electric current from a power supply device (and not a commercial power source) to a workpiece during a heating process, such as pre-drying and curing, self-heating (which occurs inside coils) in combination with induction heating permits abbreviation of a processing time for pre-drying to a matter of minutes, and a processing time for curing to within one hour. Further, the power supply device of the embodiment can be applied to all kinds of processes included in a process of infiltrating a varnish to wire-wound coils of a rotary electric machine and of curing the varnish, processes which are a pre-drying process, a gelating process (according to which the varnish that has been infiltrated is gelated), and a curing process (according to which the varnish is cured or hardened). Especially, the embodiment is particularly effective if the power supply device were applied to a varnish dropping-infiltrating process through which a workpiece is preferably rotated.

Further, it is preferable that a workpiece is rotated while supported at a radially inner side thereof. In such circumstances, by supporting the workpiece at the radially inner side thereof, it becomes possible to remove obstacles that surround the workpiece, thereby permitting installation of a varnish-dropping device at an optimum position.

Still further, it is preferable that the reciprocating rotating device repeats rotation of a workpiece at 360 degrees or more in a rotational direction. It is thus possible to minimize the number of varnish-supplying devices provided at a varnish-infiltrating device, thereby downsizing the rotary electric machine-manufacturing apparatus according to the embodiment.

Still further, the reciprocating rotating device can repeat rotation of the workpiece at a rotational angle within a rotational angle range between 180 degrees or more and up to less than 360 degrees in a rotational direction. In this case, it is preferable that the varnish-supplying device of the varnish-infiltrating device is installed at at least two positions for every target portion for the application of varnish to wire-wound coils. Each target portion for the application of varnish to the wire-wound coils is, for example, an outer peripheral surface or an inner peripheral surface at each coil end. In this case, the varnish-supplying device can be installed and rotated so as not to interfere with other components such as coil terminals and connector electric supply lines. Further, even when the varnish-supplying device supplies varnish to inner peripheral surfaces of coil ends at a coil terminal side, the varnish-supplying device can be installed so as to extend from an outer side of the coils. Especially, when the workpiece is to be supported at the radially inner side thereof, it is possible to prevent varnish from becoming attached to a member supporting the workpiece.

Still further, the reciprocating rotating device can also repeat rotation of a workpiece at a rotational angle within a rotational angle range between 120 degrees or more and up to less than 180 degrees in a rotational direction. In this case, it is preferable that the varnish-supplying device of the varnish-infiltrating device is installed at at least three positions for every target portion for the application of varnish to the wire wound coils.

As the varnish-supplying device, in addition to a conventional type that drops varnish in a vertical direction from nozzles, for example, an injector-type (which discharges varnish by use of an injector) and a coater roll-type (which transfers and applies varnish from a coater roll that has raised the varnish) can be employed.

FIGS. 1 and 2 illustrate a rotary electric machine-manufacturing apparatus for manufacturing a stator embedded with three-phase coils according to a first embodiment. As illustrated therein, this apparatus has a structure made up of a rotator 2 on a device table 1, a chuck 3 serving as a workpiece-supporting device attached to the rotator 2, a high-frequency power supply device 4 that is provided separately (FIG. 3), and a workpiece outer periphery-supporting device 5. A varnish dropping-infiltrating device 6 is positioned and supported by a base frame that is different from the device table 1, and dropping nozzles 61 (varnish supplying nozzles) of the varnish dropping-infiltrating device 6 extend vertically towards a workpiece S.

The rotator 2 is configured with a main shaft 20, of which both ends are freely rotatably supported by bearings 11 at the device table 1, and a motor 22 which is activated to reciprocatingly rotate the main shaft 20 via a transmission mechanism 21 at one side of the main shaft 20. The transmission mechanism 21 according to the first embodiment is configured with a belt transmission mechanism having a timing belt and a pulley. Moreover, in order to avoid disturbances associated with electric supply lines 7 and disturbances which may occur due to a reciprocating rotation of the main shaft 20, an electric supply line twist-inhibiting mechanism 70 is positioned between the bearings 11 supporting the main shaft 20. The electric supply line twist-inhibiting mechanism 70 includes a cable bare. The electric supply lines 7 from the power supply device are supported by the electric supply line twist-inhibiting mechanism 70. The chuck 3 is equipped at the other end of the main shaft 20, and the chuck 3 holds the workpiece S from an inner diameter side thereof. When the rotary electric machine-manufacturing apparatus performs a varnish-dropping process, in order to disperse uneven applications of varnish, which may occur due to the reverse rotation of the rotator 2, a reverse rotational position can be varied arbitrarily by intervals of 10 degrees within a range of 0-360 degrees in terms of a reverse rotational angle. The workpiece outer periphery-supporting device 5 is positioned below the workpiece S. A tray 62, which receives varnish, is provided inside a base frame of the workpiece outer periphery-supporting device 5.

The high-frequency power supply device 4, as is illustrated in FIG. 3, is connected to a commercial three-phase electric power source 40 of 200V via a noise-canceling transformer 41. The high-frequency power supply device 4 converts a three-phase electric current that excludes any waveform disturbances resulting from noise canceling to a direct electric current. For example, the high-frequency power supply device 4 is provided with a rectifier 42 having, for example, a converter; a smoother 43 having, for example, a condenser; and a high-frequency generator 44 having, for example, an inverter. The smoother 43 is employed for the purpose of smoothing a pulsating flow rectified by the rectifier 42. The high-frequency generator 44 converts, the direct electric current smoothed by the smoother 43 to a high-frequency electric current at a single-phase frequency level of approximately 20 kHz. The high-frequency generator 44 is controlled by a controller 45, which is connected to, for example, a temperature information obtaining device 46, and a condition inputting device 47 that inputs heating conditions, in a manner such that temperature information and controlling conditions are input into the controller 45. The temperature information obtaining device 46 has, as a detecting element, a thermistor embedded in wire-wound coils Sc. In FIG. 3, the reference "S" refers to, as a workpiece S that is an object of processing, a stator in which the wire-wound coils Sc have been inserted.

With further reference to FIGS. 1 and 2, the high frequency power supply device 4 and the wire-wound coils Sc of the workpiece S can be connected to each other via the electric supply lines 7. More specifically, the chuck 3 supports a three-phase connector 71 of the three electric supply lines 7 from the high-frequency power supply device 4. A wire connecting device provided with a connector 72 fitted into the connector 71 can be attached to the chuck 3. The wire connecting device is configured with a terminal table 73 having three-phase junction terminals. The terminal table 73 includes a reverse C-shaped mounting bracket, and the three-phase junction terminals that are made from electric conductors fixedly mounted on the mounting bracket via an insulating material. The mounting bracket possesses boltholes at its leg portions, boltholes that are employed so as to attach to the chuck 3. Each junction terminal is connected, via electric leads 74, to the connector 72 on the terminal table 73 side. Each junction terminal is provided with a connecting portion that is freely attached to, and detached from, each lead terminal of each wire-wound coil.

Next, described below is a method of implementing, by use of the rotary electric machine-manufacturing apparatus, each process step in the varnish-infiltrating process. Prior to implementing these processes, the workpiece S is set at the rotator 2 in a condition where the workpiece S is being held by the chuck 3, and the lead terminals (U-phase, V-phase, and W-phase) of the wire-wound coils Sc are connected to the three-phase junction terminals of the terminal table 73. Then, the connector 72 of the electric leads 74 extending from the terminal table 73 is inserted into the connector 71 at the chuck 3 side. Preparation for implementing the following processes is completed as described above. The process preparation can be equally applied to all processes described later.

In order to first implement a pre-drying process, a heat treatment is performed by operating only the high-frequency power supply device 4. In this case, a high-frequency electric current output side of the high-frequency power supply device 4 is connected to the wire-wound coils Sc of the workpiece S set at the table 1 by the chuck 3. Electric power is then supplied in order of a U-V phase, a V-W phase, and a W-U phase. In response to the electric power supply to the wire-wound coils Sc, the workpiece S can generate heat internally as a result of self-heating internally generated and of induction-heating. Therefore, it is possible to release residual stress that occurred when the wire-wound coils Sc were wound with wires and inserted into slots, and also to evaporate moisture contained in the workpiece S.

In order to implement a varnish dropping-infiltrating process, a heat treatment and a dropping-infiltrating treatment are next performed simultaneously by operating both the rotator 2 and the varnish dropping-infiltrating device 6 at the same time while operating the high-frequency power supply device 4. In this case, by operating the high-frequency power supply device 4, the workpiece S is maintained, by means of electric power supply that is identical to that described above, at a temperature level where varnish viscosity can be optimized. In such circumstances, by rotating the workpiece S in response to an operation of the rotator 2, varnish that drops from each nozzle 61 of the varnish dropping-infiltrating device 6 can possess an optimum flowability, and can accordingly infiltrate equally into deep portions of the workpiece S because an optimum temperature can be maintained. Therefore, it is possible to uniformly apply varnish to the workpiece S.

When a curing process is implemented following the varnish dropping-infiltrating process, a heat treatment is performed by operating the rotator 2 while operating the high-frequency power supply device 4. In this case, by operating the high-frequency power supply device 4, the workpiece S is maintained, by means of an electric power supply that is identical to that described above, at an optimum temperature at which varnish can be cured. In such circumstances, by rotating the workpiece S in response to an operation of the rotator 2, the varnish applied to the workpiece S can be protected from deflecting in favor of flowability of the varnish that has initially been cured in order to decrease the time required to cure the varnish. Therefore, it is possible to obtain an evenly cured condition of the varnish.

Figure 4:
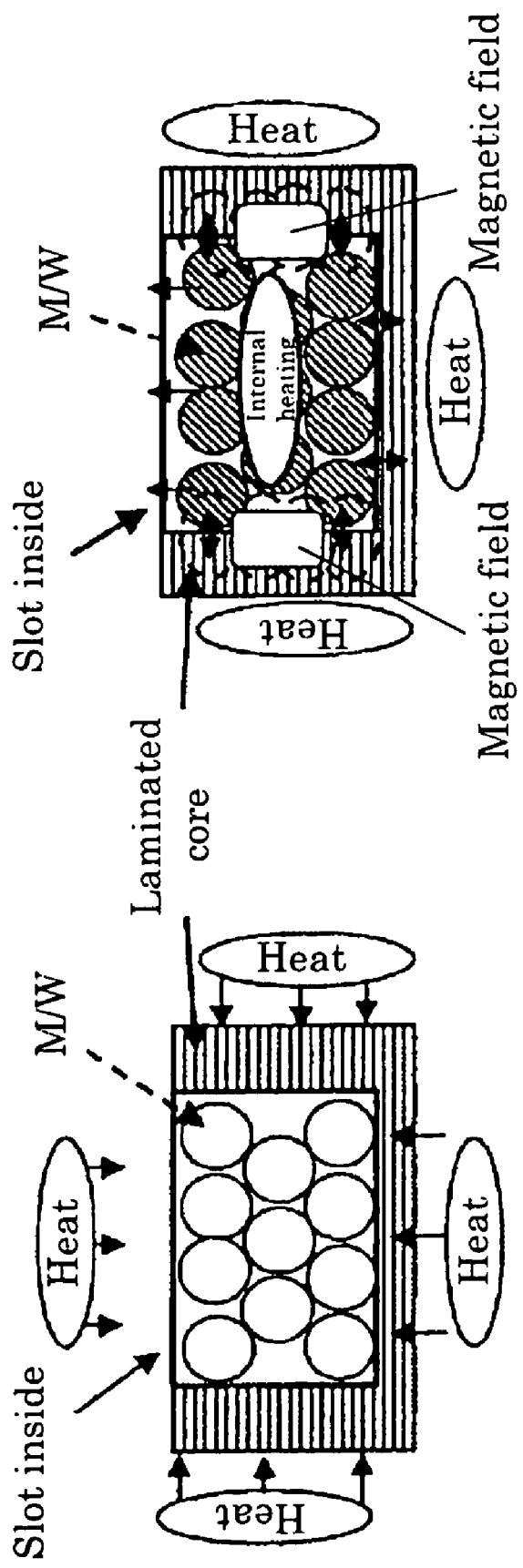
FIG. 4 is a pattern diagram comparing a heating principle using high-frequency heat and a conventional heating principle.

FIG. 4 illustrates a heating principle in which high frequency heat is used, in terms of a comparison with a conventional heating principle. FIG. 4 is a pattern diagram illustrating a cross section of a laminated core slot of the workpiece S. According to the conventional heating principle, by use of an oven, illustrated at the left side in FIG. 4, heat emanating from a heater is aerially transmitted to the workpiece S. In this case, because the temperature of the workpiece S is gradually increased from the exterior, a long curing time is required. On the other hand, according to the heating principle based on a high frequency heat according to the invention, a high-frequency electric current is supplied to magnet wires M/W inside the slots. In this case, self-heating of the magnet wires M/W occurs due to electric resistance thereof. Further, a magnetic field is generated as a result of electric current supplied to the magnet wires M/W. Over current is then generated at the core and the core itself thus generates heat. Therefore, because the workpiece S itself generates heat, it is possible to cure the varnish applied to the insides of the slots for an abbreviated curing time.

As is apparent from the above-described processes, the heating process with the apparatus of the invention can be achieved only by connecting the high-frequency power supply device 4 with the workpiece S, thus eliminating the need for devices surrounding the workpiece S. In such a manner, the varnish dropping infiltrating device 6 can be arranged at an optimum position. Moreover, in the conventional heating process with an oven or a hot blast-circulating furnace, a process for dropping varnish onto the workpiece S was programmed at various stages. However, according to the heating process of the invention, all processes from pre-drying to curing can be performed at a single stage. Moreover, by supplying a high-frequency electric current to the workpiece S while the workpiece S is being rotated, the coil can be heated up. Therefore, the temperature information obtaining device 46 embedded in the coils can sense the temperature and feedback information of the temperatures to the high-frequency power supply device 4. By controlling the amount of electric current to be supplied and the time spent on electric excitation, it is therefore possible to maintain a temperature of the coils at appropriate levels. As a result, when a heat treatment is performed at a time of dropping the varnish to the workpiece S, fluctuations in the temperature of the workpiece S can be restrained, and fluctuations in varnish viscosity can be also restrained. By maintaining a degree of varnish viscosity that is optimum for varnish dropping, it is therefore possible to smoothen the infiltration of the varnish into spaces between magnet wires, and also to abbreviate a required time.

As described above, according to the first embodiment of the invention, by directly supplying a high-frequency electric current to the wire-wound coils Sc, self-heating (which occurs from within the wire-wound coils Sc) in combination with induction heating shortens a heating processing time for pre-drying, gelating, and curing to a short period (approximately 0.5 to 1 hour). Further, large-scale devices, such as an oven and a heat blast-circulating furnace as devices for heating the wire-wound coils Sc, are not needed. Therefore, it is possible to downsize the apparatus by having only the high-frequency power supply device 4. Still further, even if defective products are produced, processing results can be found in a short time because the processing time is short. Therefore, it is possible to find defective products at an early stage, and to minimize losses. Still further, by monitoring the temperatures of the wire-wound coils Sc or resistances that vary in response to temperatures, and by controlling such temperatures, it is possible to cure the varnish with high reliability and to stabilize the quality of the product.

The temperature information obtaining device 46 is not limited to a thermistor, and other elements such as a non-contact type heat gauge, a thermocouple or a thermo-tracer can also be applied. Further, when a magnetic material such as iron is utilized to form the chuck 3 supporting the workpiece S, the chuck 3 becomes heated due to induction heating. In this case, the high level of heat of the chuck 3 is transmitted to the wire-wound coils Sc, thereby causing fluctuations in temperatures. Accordingly, in order to inhibit generation of heat by the chuck 3, it is desirable that the chuck 3 is made of a material such as aluminum, copper or ceramics, all of which possess characteristics of high conductivity. In this case, there is no need to worry about the occurrence of fluctuations in the temperatures of the coils.

Figure 5:
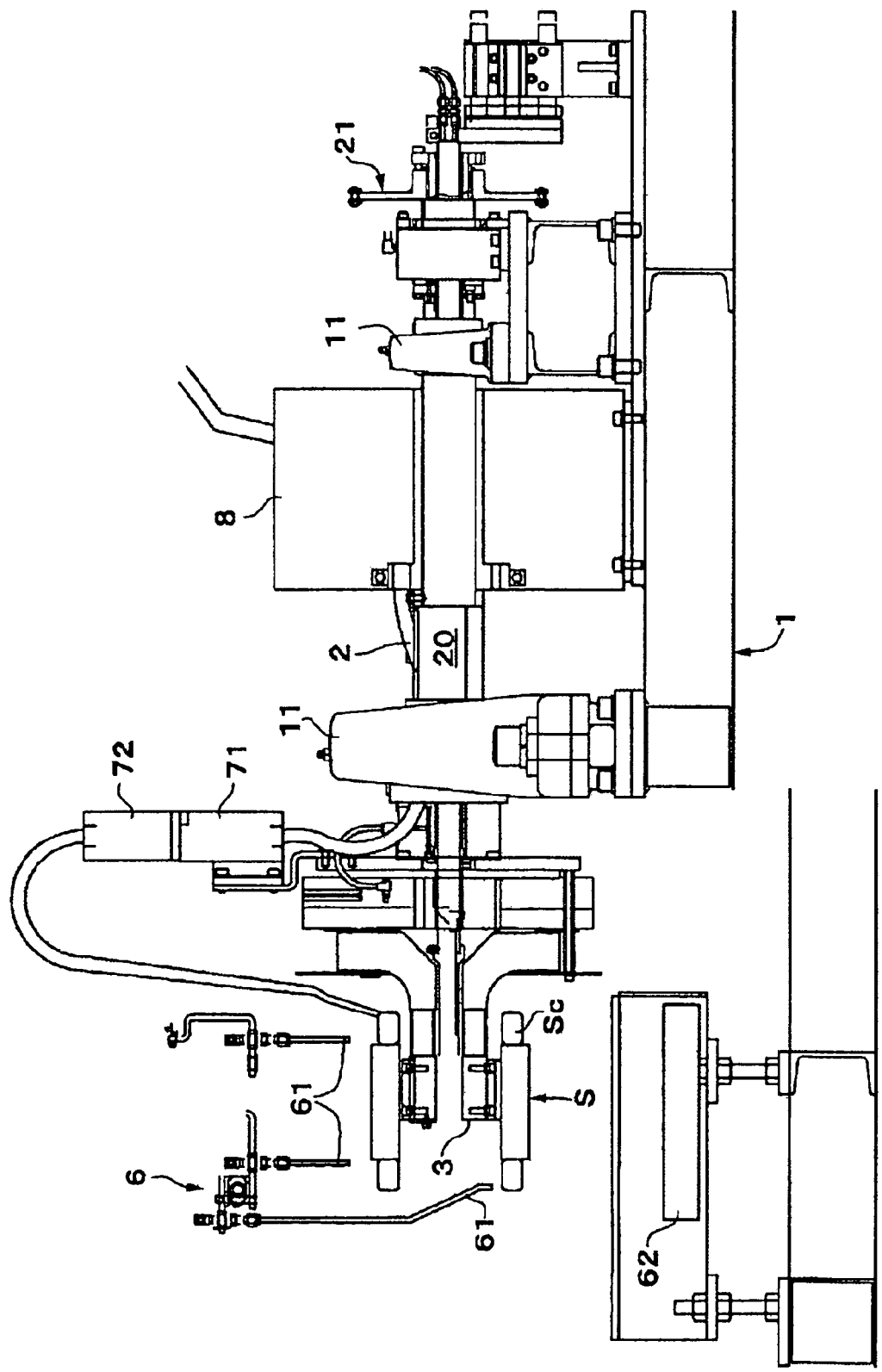
FIG. 5 is a partial sectional side view illustrating a rotary electric machine-manufacturing apparatus according to another embodiment.

FIG. 5 illustrates a rotary electric machine-manufacturing apparatus according to a second embodiment. This apparatus is essentially the same as in the first embodiment, apart from the rotator 2. Portions corresponding to the first embodiment are denoted with the same reference numerals, and only different points are explained below. In this apparatus, a continuously rotating device is employed as the rotator 2. Because a rotation activating mechanism is identical to that in the above description, FIG. 5 illustrates only a pulley at a driven side of the transmission mechanism 21, and illustrations of related mechanisms including a motor are omitted. As a result of employing this continuously rotating device, a slip ring 8 is disposed halfway on the electric supply lines connecting the non-illustrated high-frequency power supply device with the wire-wound coils Sc of the workpiece S. The slip ring 8 is employed so as to continuously supply and receive, by slidable movement at a relatively rotating portion, electric current between a stationary side and a rotating side. This slip ring 8 is located between the bearings 11 supporting the main shaft 20. This slip ring 8 includes a three-set ring for electrically exciting the three-phase type wire-wound coils Sc of the workpiece S, and another ring for sending to the power supply device 4, by a feed-back method, signals outputted by the temperature information obtaining device 46 embedded in the wire-wound coils of the workpiece S in such a manner that electric power to be supplied can be controlled.

A specific method of implementing, by use of this apparatus, each process step in the varnish-infiltrating process is identical to the method according to the first embodiment, and a description thereof is omitted herein.

According to the second embodiment, the pulling amount of the electric supply lines 7 does not require an extra device for a reverse rotation, and a cable bare or cable carrier, so that the pulling amount of the electric supply lines 7 can be minimized. Further, a structure of the apparatus becomes slightly complicated by an amount that the slip ring 8 moves. However, when the varnish dropping-infiltrating process is implemented, an advantage can be secured, in that by always rotating the workpiece S in a rotational direction, the varnish can be further uniformly applied to the workpiece S. Further, in contrast with a method of oscillating the workpiece S according to the first embodiment, control of a reverse rotational position is not necessary. Therefore, controlling operations of the high-frequency power supply device 4 and of a motor of the rotator 2 can be simplified. Other effects produced by the second embodiment are the same as effects produced in the first embodiment.

A third embodiment features modified examples in connection with the reciprocating rotational angle of the rotator 2 according to the first embodiment, and with a structure to locate the dropping nozzles 61 for supplying a varnish 99. First of all, FIGS. 6A-8 illustrate an example in which a reciprocating rotating device, which rotates every 360 degrees, is employed as the rotator 2.

Figure 6A:
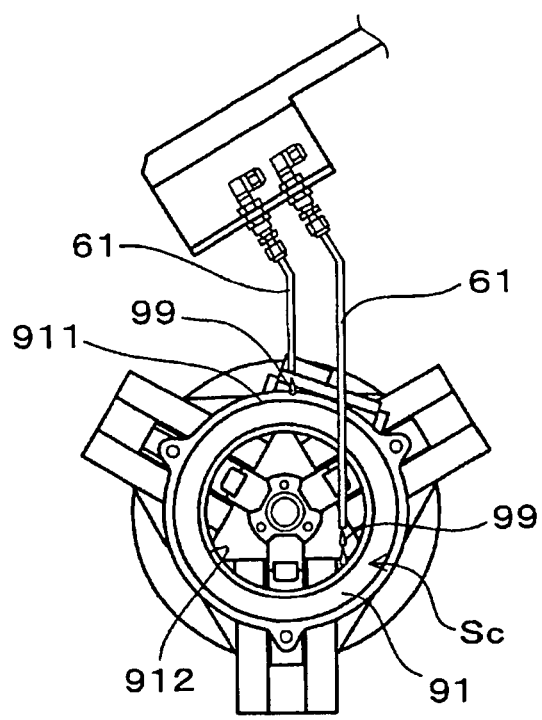
FIG. 6A is an explanatory diagram for explaining a structure, and an orientation, of dropping nozzles, as viewed from a workpiece end side, when reciprocating rotation at 360 degrees or more according to another embodiment.
Figure 6B:
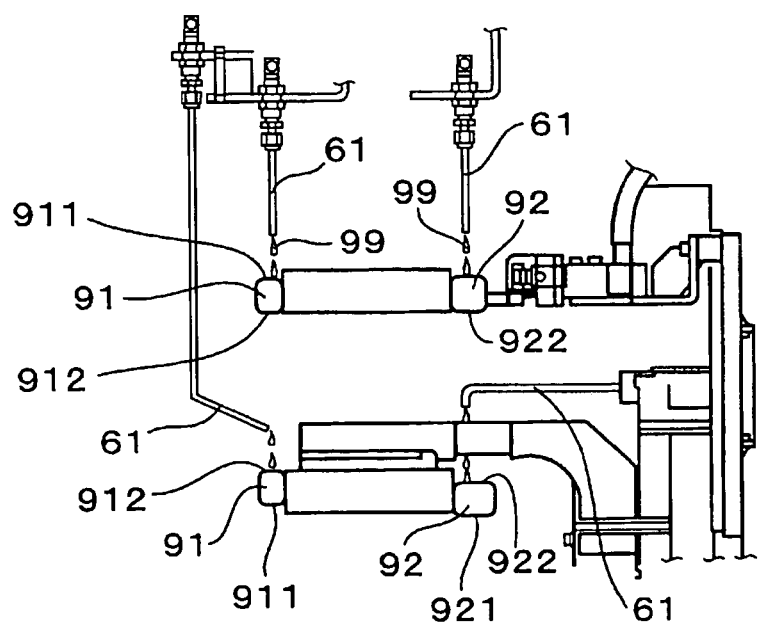
FIG. 6B is an explanatory diagram for explaining the structure, and the orientation, of the dropping nozzles, as viewed from a workpiece axially cross section, when reciprocating rotation at 360 degrees or more according to the embodiment.

FIGS. 6A and 6B illustrate an example in which the dropping nozzles 61 for dropping the varnish 99 downwards vertically are respectively allocated at a position for every single target portion for applying the varnish to the wire wound-coils, an arrangement which is identical to that of the first embodiment. That is, as illustrated in FIGS. 6A and 6B, a dropping nozzle 61 is allocated to each outer peripheral surface 911 and 921 of each coil end 91 and 92 of the wire-wound coils Sc. Likewise, a dropping nozzle 61 is allocated to each inner peripheral surface 912 and 922 of each coil end 91 and 92 of the wire-wound coils Sc. In this case, by dropping the varnish 99 from the dropping nozzles 61 while the wire-wound coils Sc, as the workpiece S, are being rotated in a reciprocating manner every 360 degrees, it is possible to supply the varnish 99 uniformly onto the outer peripheral surfaces 911 and 921 and the inner peripheral surfaces 912 and 922 of the coil ends 91 and 92.

Figure 7:
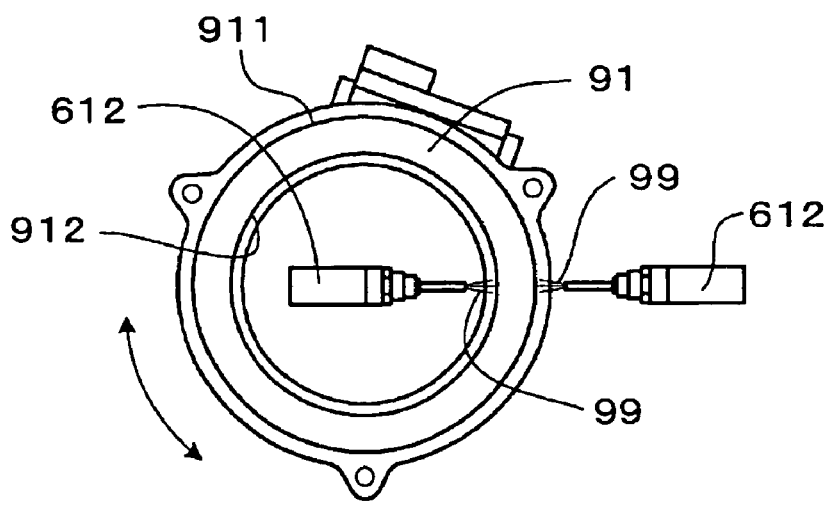
FIG. 7 is an explanatory diagram for explaining the structure, and the orientation, of the dropping nozzles when reciprocating rotation at 360 degrees or more according to the embodiment.

FIG. 7 illustrates an example, in which injector-type dropping nozzles 612 for spraying the varnish 99 are allocated at a position for every single target portion for applying varnish to the wire wound-coils. In FIGS. 7 and 8 to 16, in order to facilitate an understanding of illustrations therein, each figure represents a view that essentially illustrates only the workpiece S and the dropping nozzles. According to the example illustrated in FIG. 7, irrespective of the direction for dropping the varnish 99, a direction that is determined by gravity, the dropping nozzles 612 can be allocated at appropriate positions, thereby enhancing the flexibility of the structure of the rotary electric machine-manufacturing apparatus.

Figure 8:
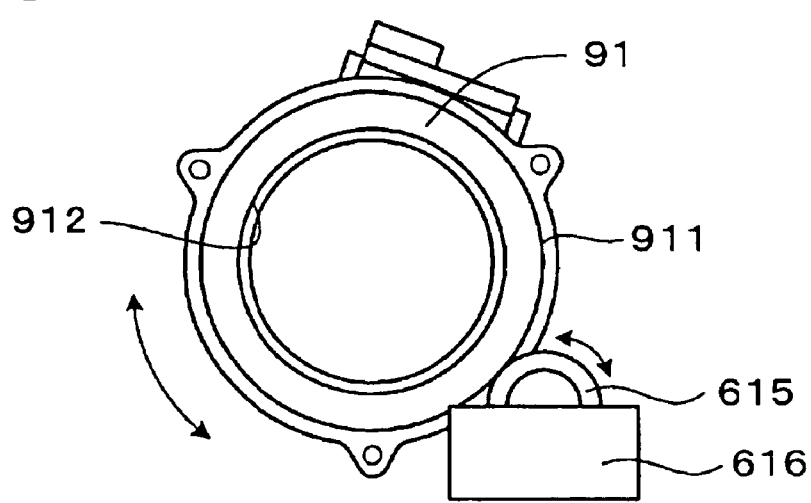
FIG. 8 is an explanatory diagram for explaining a structure, and an orientation, of a coater roll-type varnish-supplying device for reciprocating rotation at 360 degrees or more according to the embodiment.

FIG. 8 illustrates an example, in which the varnish 99 is applied to the outer peripheral surfaces 911 and 921 of the coil ends 91 and 92 by roll coating. In this case, a varnish-infiltrating device, which includes a tray 616 in which the varnish 99 is accumulated, and a coater roll 615 for raising the varnish 99 accumulated in the tray 616. In this case, commensurately with a width of the coater roll 615, it is accordingly possible to adjust accurately the area to which the varnish is applied, and thus enhance an application degree of varnish.

FIGS. 9 to 12 illustrates examples, in which a reciprocating rotation device is employed as the rotator 2, which rotates every rotational angle within a rotational angle range of between 180 degrees or more and up to less than 360 degrees.

Figure 9:
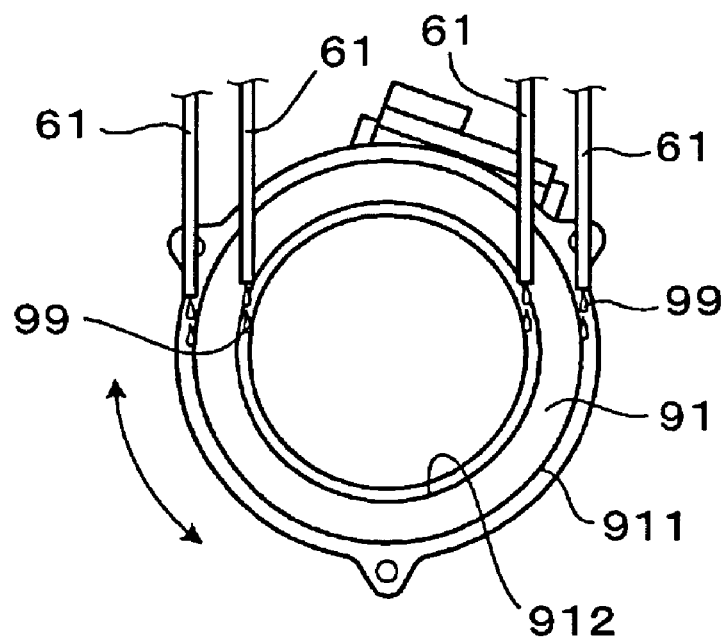
FIG. 9 is an explanatory diagram for explaining a structure, and an orientation, of the dropping nozzles when reciprocating rotation at 180 degrees or more according to the embodiment.
Figure 10A:
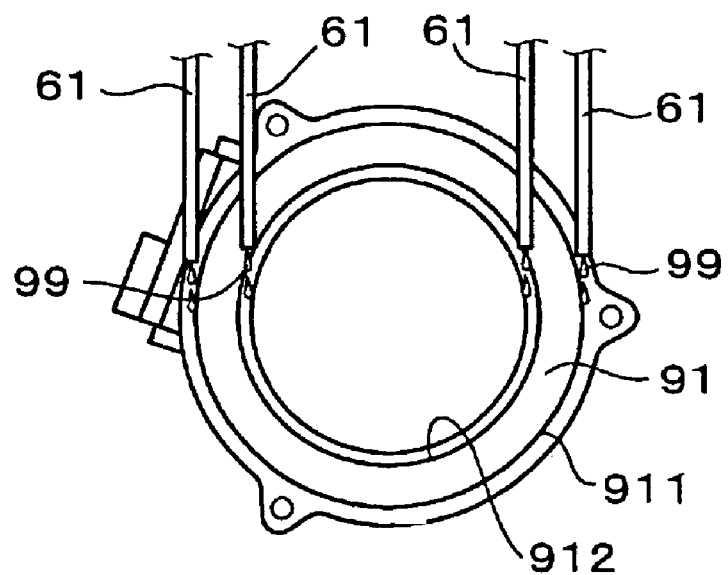
FIG. 10A is an explanatory view for explaining an example for applying varnish when reciprocating rotation at 180 degrees according to the embodiment.
Figure 10B:
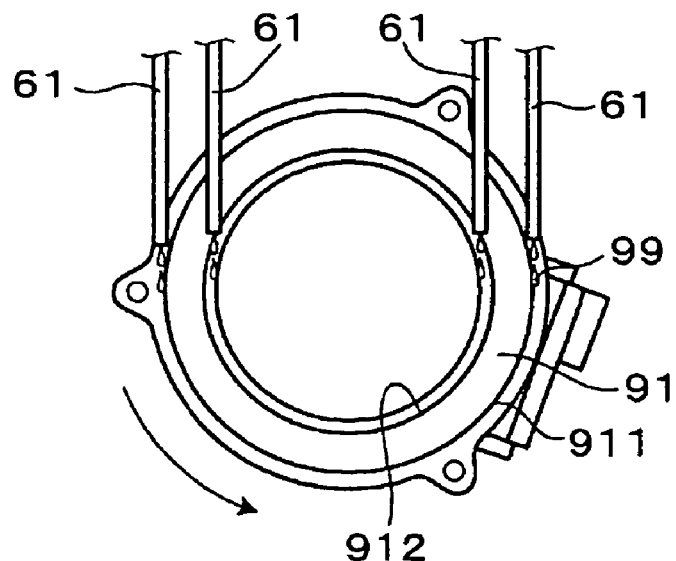
FIG. 10B is an explanatory view for explaining the example for applying varnish when reciprocating rotation at 180 degrees according to the embodiment.
Figure 10C:
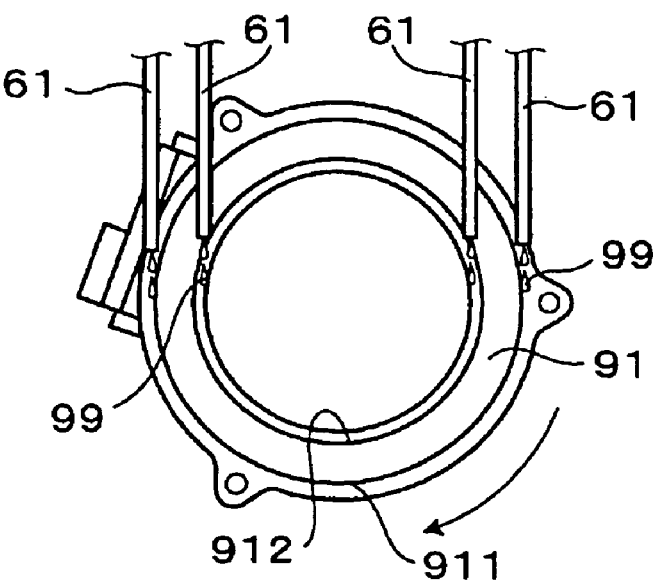
FIG. 10C is an explanatory view for explaining the example for applying varnish when reciprocating rotation at 180 degrees according to the embodiment.

FIG. 9 illustrates an example, in which the dropping nozzles 61 for dropping the varnish 99 downwards vertically are respectively allocated at two positions for every target portion for applying varnish to the wire wound-coils. That is, the two dropping nozzles 61 are allocated at positions separated by about 180 degrees to each outer peripheral surface 911 of the coil end 91 and outer peripheral surface 921 of the coil end 92. Likewise, the two dropping nozzles 61 are allocated at positions separated by about 180 degrees to each inner peripheral surface 912 of the coil end 91 and inner peripheral surface 922 of the coil end 92. In this case, as illustrated in FIGS. 10A-10C, while the wire-wound coils Sc as the workpiece S is reciprocatingly being rotated approximately every 180 degrees, the dropping nozzles 61 drop the varnish 99. That is, by rotating the wire-wound coils Sc at about 180 degrees in a first rotational direction (counter-clockwise direction) FIG. 10A→FIG. 10B, and then rotating them at about 180 degrees in an opposite rotational direction (clockwise direction) FIG. 10B→10C it is possible to supply the varnish 99 uniformly to the outer peripheral surfaces 911 and 921 and the inner peripheral surfaces 912 and 922 of the coil ends 91 and 92.

Figure 11:
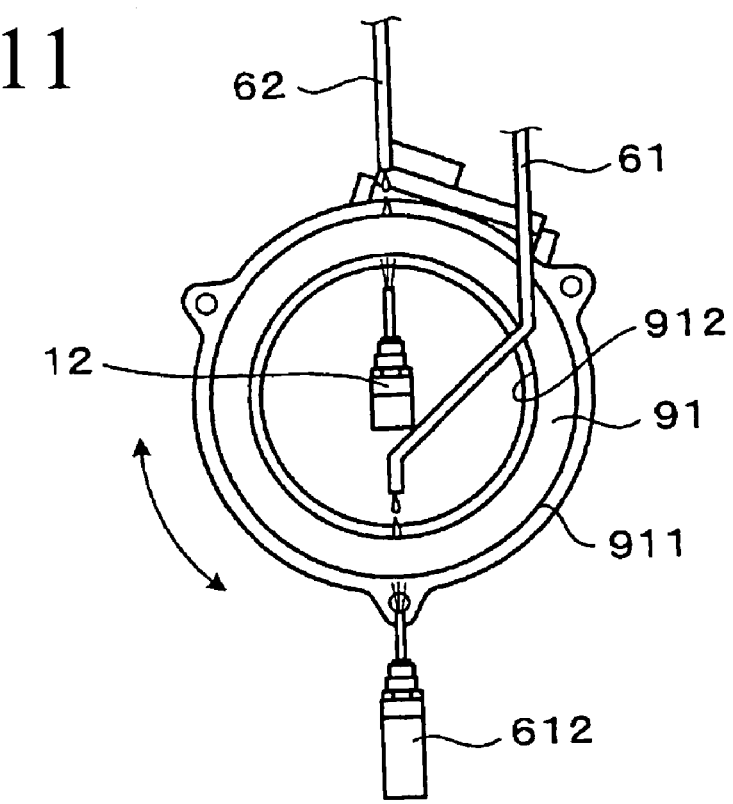
FIG. 11 is an explanatory diagram for explaining a structure, and an orientation, of the dropping nozzles when reciprocating rotation at 180 degrees or more according to the embodiment.

FIG. 11 illustrates an example, in which injector-type dropping nozzles 612 are employed in combination with the normal dropping nozzles 61. More specifically, as is illustrated therein, in term of the nozzles for applying the varnish onto the outer peripheral surfaces 911 and 921 of the coil ends 91 and 92, the dropping nozzles 61 (each of which faces a vertically top portion of the workpiece S) are utilized in combination with the injector-type dropping nozzles 612 (each of which faces a vertically bottom portion of the workpiece S). In terms of the nozzles for applying the varnish onto the inner peripheral surfaces 912 and 922 of the coil ends 91 and 92, the dropping nozzles 61 (each of which faces a vertically bottom portion of the workpiece S) are utilized in combination with the injector-type dropping nozzles 612 (each of which faces a vertically top portion of the workpiece S). In this case, it is possible to supply the varnish 99 vertically from the front relative to the outer peripheral surfaces 911 and 921 of the coil ends 91 and 92, or to the inner peripheral surfaces 912 and 922 thereof, thereby further enhancing a degree of precision in applying varnish.

Figure 12:
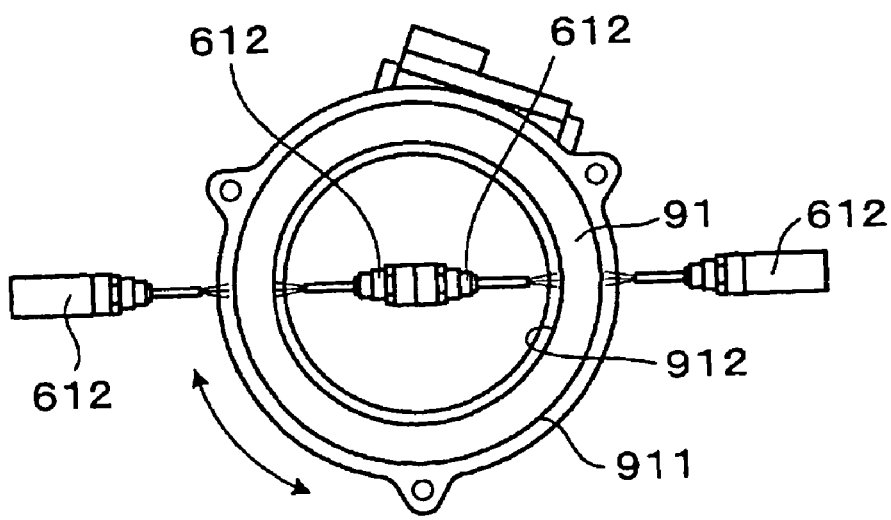
FIG. 12 is an explanatory diagram for explaining a structure, and an orientation, of the dropping nozzles when reciprocating rotation at 180 degrees or more according to the embodiment.

FIG. 12 illustrates an example in which the two nozzles are injector-type dropping nozzles 612. In this case, irrespective of the direction for dropping the varnish 99, a direction that is determined by gravity, the dropping nozzles 612 can be allocated at appropriate positions, thereby enhancing the flexibility of the structure design of the rotary electric machine-manufacturing apparatus.

Next, FIGS. 13 through 16 illustrate an example in which a reciprocating rotating device is employed as the rotator 2, which reciprocatingly rotates every rotational angle within a rotational angle range of between 120 degrees or more and up to less than 180 degrees.

Figure 13:
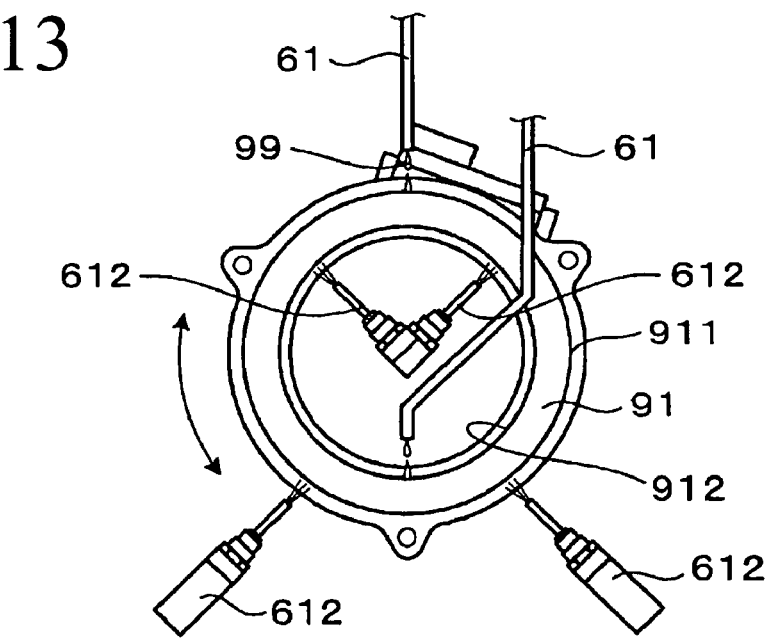
FIG. 13 is an explanatory diagram for explaining a structure, and an orientation, of the dropping nozzles when reciprocating rotation at 120 degrees or more according to the embodiment.
Figure 14A:
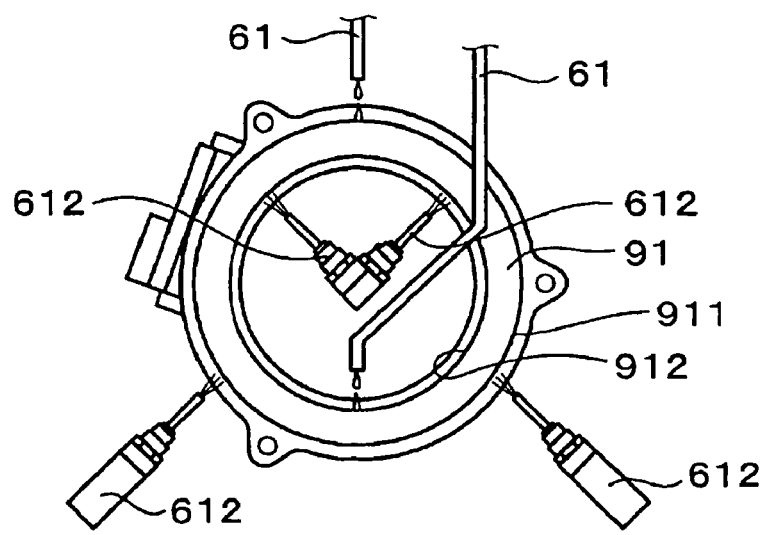
FIG. 14A is an explanatory view for explaining an example for applying varnish when reciprocating rotation at 120 degrees according to the embodiment.
Figure 14B:
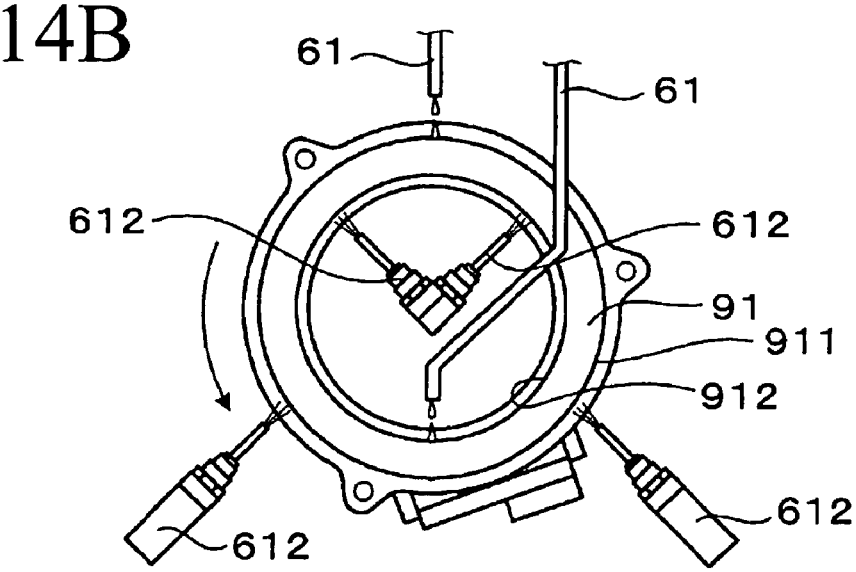
FIG. 14B is an explanatory view for explaining the example for applying varnish when reciprocating rotation at 120 degrees according to the embodiment.
Figure 14C:
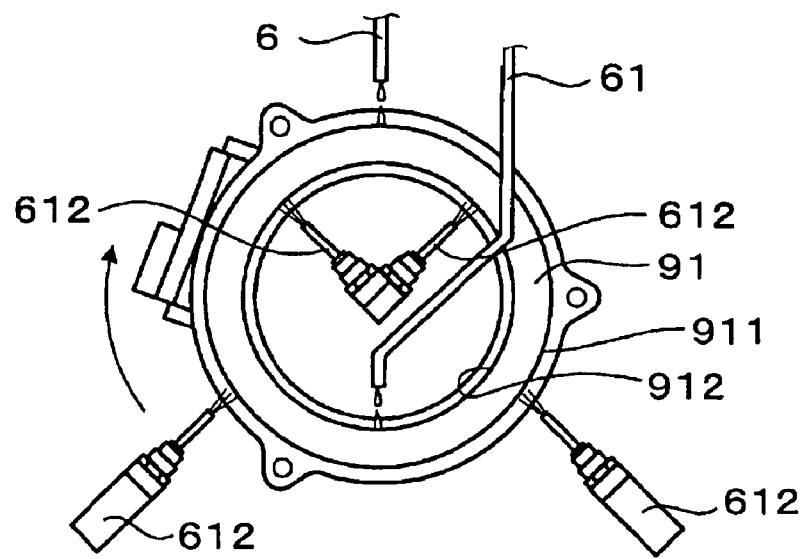
FIG. 14C is an explanatory view for explaining the example for applying varnish when reciprocating rotation at 120 degrees according to the embodiment.

FIG. 13 illustrates an example, in which a combination of dropping nozzles 61 for dropping the varnish 99 downwards vertically and the two injector-type dropping nozzles 612 are utilized for every target portion for applying varnish to the wire wound-coils Sc. The dropping nozzle 61 and two injector-type dropping nozzles 612 are allocated at positions separated by about 120 degrees, for every target portion for applying varnish to the wire-wound coils Sc. That is, in terms of each outer peripheral surface 911 and 921 of each coil end 91 and 92, a single dropping nozzle 61 is allocated at the vertically top portion of the workpiece S, and two injector-type dropping nozzles 612 are allocated respectively at positions separated by about 120 degrees from the vertically top portion. In terms of each inner peripheral surface 912 and 922 of each coil end 91 and 92, a single dropping nozzle 61 is allocated at the vertically bottom portion of the workpiece S, and the two injector-type dropping nozzles 612 are allocated respectively at positions separated by about 120 degrees from the vertically bottom portion. In this case, as illustrated in FIGS. 14A-14C while the wire-wound coils Sc as the workpiece S is reciprocatingly being rotated approximately every 120 degrees, the dropping nozzle 61 drops the varnish 99 and the dropping nozzles 612 spray the varnish 99. That is, by rotating the wire-wound coils Sc by about 120 degrees in a first rotational direction (counter-clockwise direction) FIG. 14A→FIG. 14B, and then rotating them at about 120 degrees in an opposite rotational direction (clockwise direction) FIG. 14B-FIG. 14C, it is possible to supply the varnish 99 uniformly to the outer peripheral surfaces 911 and 921 and the inner peripheral surfaces 912 and 922 of the coil ends 91 and 92.

Figure 15:
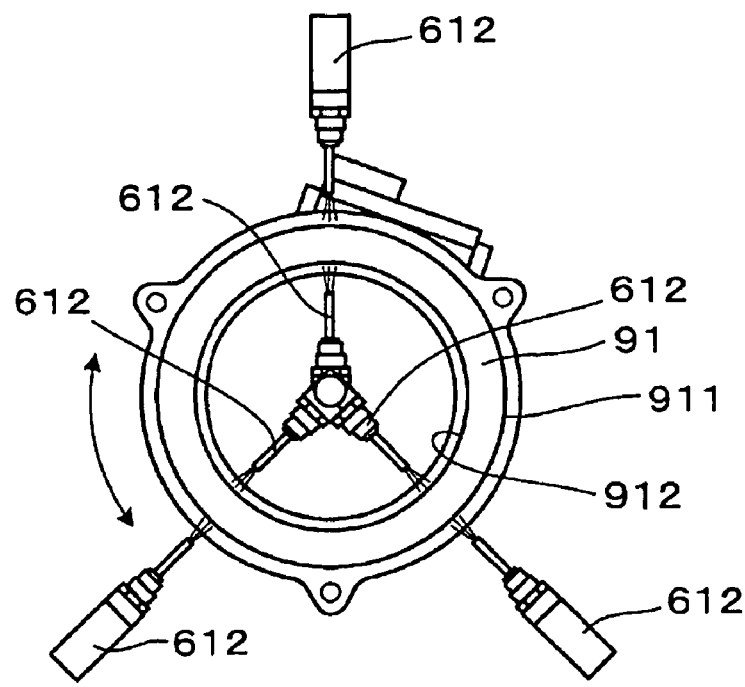
FIG. 15 is an explanatory diagram for explaining a structure, and an orientation, of the dropping nozzles when reciprocating rotation at 120 degrees or more according to the embodiment.

FIG. 15 illustrates an example, that includes three injector-type dropping nozzles 612 for every target portion for applying varnish to the wire wound-coils Sc. In this case, irrespective of the direction for dropping the varnish 99, a direction that is determined by gravity, the dropping nozzles 612 can be allocated at appropriate positions, thereby enhancing the flexibility of the structure of the rotary electric machine-manufacturing apparatus.

Figure 16:
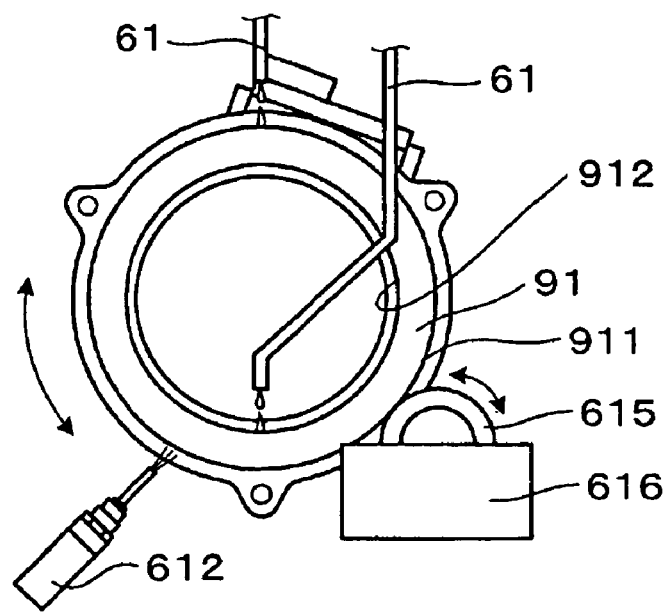
FIG. 16 is an explanatory view for explaining a structure, and an orientation, of the dropping nozzles and the coater roll-type varnish supplying means when reciprocating rotation at 120 degrees or more according to the embodiment.
Figure 17:
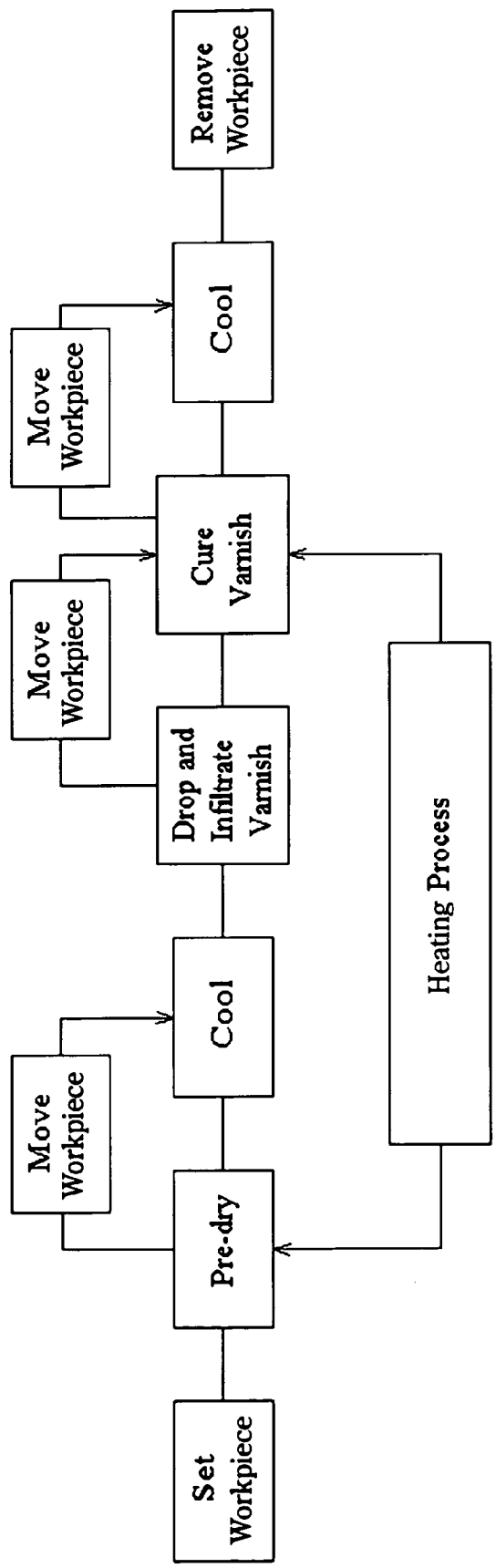
FIG. 17 is an explanatory view for explaining a common varnish-infiltrating process.
Figure 18:
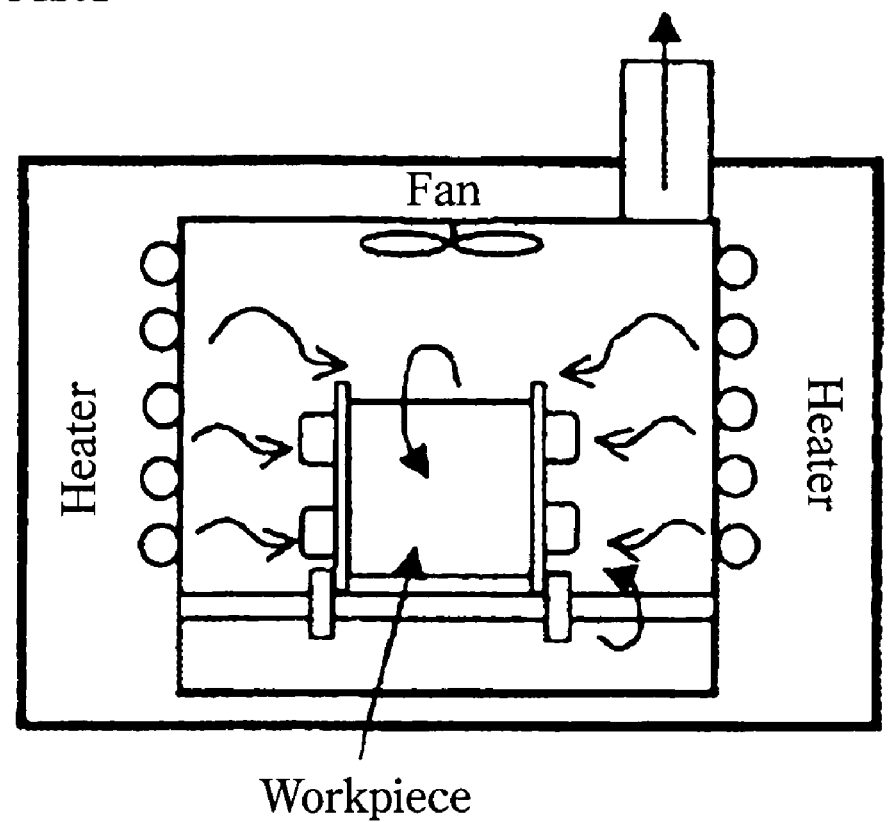
FIG. 18 is a pattern diagram schematically illustrating a conventional heating process with an oven.
Figure 19:
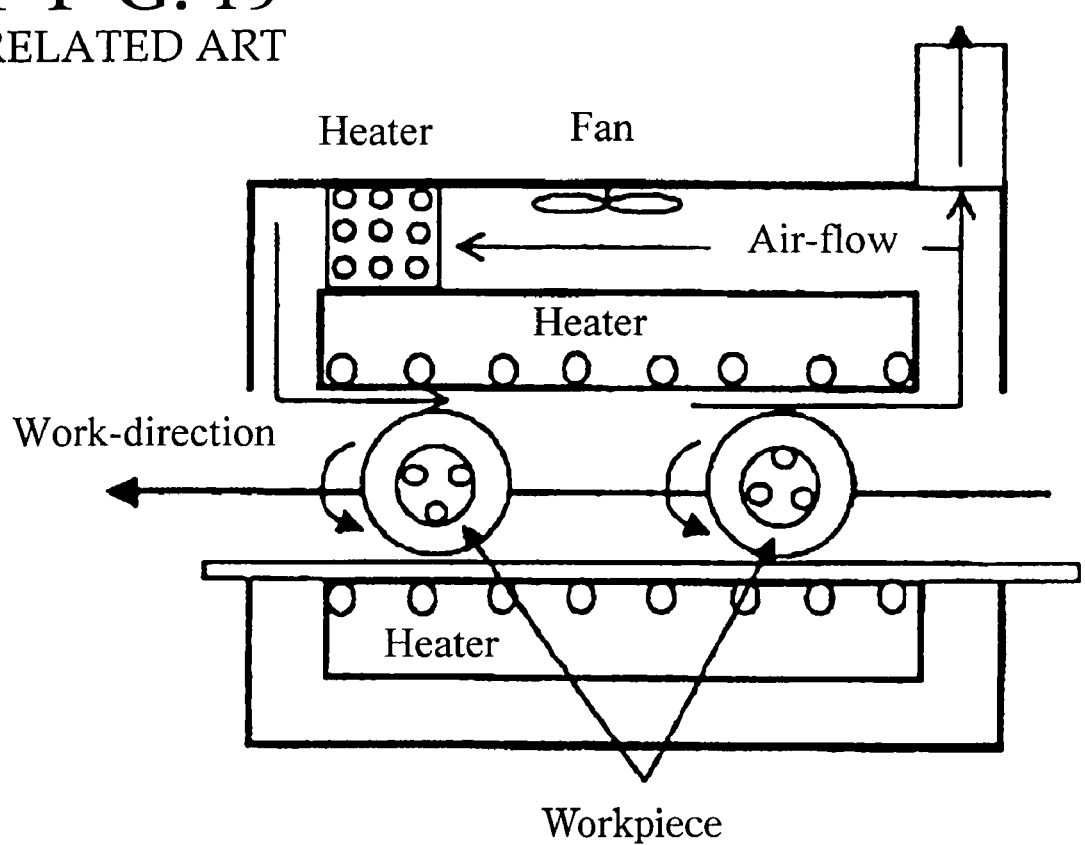
FIG. 19 is a pattern diagram schematically illustrating a conventional heating process with a hot blast-circulating furnace.
Figure 20:
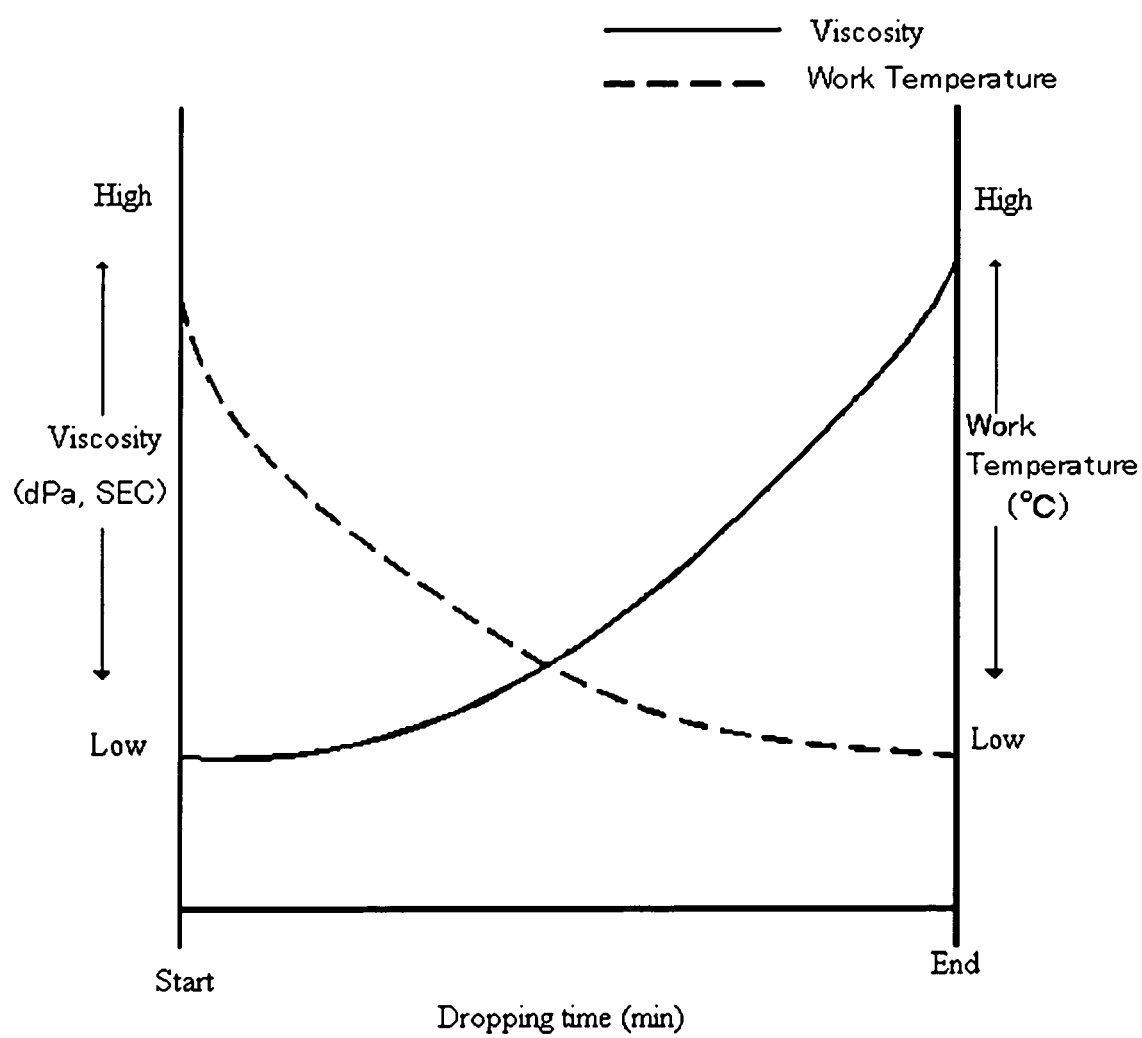
FIG. 20 is a graph for explaining variations in varnish viscosity while varnish is being dropped by a conventional method.

FIG. 16 illustrates an example that includes a combination of the dropping nozzle 61 for dropping the varnish 99 downwards vertically, the injector-type dropping nozzle 612 and a coater roll 615 for roll-coating, is utilized every target portion for applying varnish to the wire-wound coils Sc. The dropping nozzle 61, the injector-type dropping nozzle 612 and the coater roll 615 are allocated at positions separated by about 120 degrees for every target portion for applying varnish to the wire-wound coils Sc. That is, in terms of each outer peripheral surface 911 and 921 of each coil end 91 and 92, the dropping nozzle 61 is allocated at the vertically top portion of the workpiece S, and the injector-type dropping nozzles 612 and the coater roll 615 are allocated respectively at positions separated at about 120 degrees from the vertically top portion. In terms of each inner peripheral surface 912 and 922 of each coil end 91 and 92, the singular dropping nozzle 61 is allocated at the vertically bottom portion of the workpiece S, and the injector-type dropping nozzles 612 and the coater roll 615 (not shown) are allocated respectively at positions separated by about 120 degrees from the vertically bottom portion. In this case, it is also possible to supply the varnish 99 uniformly to the outer peripheral surfaces 911 and 921 and the inner peripheral surfaces 912 and 922 of the coil ends 91 and 92.

The invention can be widely applied to manufacturing a stator, or a rotor, of a common multiple-phase rotary electric machine. For example, the invention can be applied to each process step in a process of infiltrating varnish into three-phase coils of a three-phase induction motor or generator.

According to an exemplary aspect of the invention, because a rotator for rotating a workpiece is provided, rotation of the work at a time of dropping the varnish enables a uniform application of the varnish.

According to another exemplary aspect of the invention, by directly supplying electric current to the wire-wound coils, self-heating, which occurs from within the wire-wound coils in combination with induction heating, occurs during at least pre-drying and curing. Self-heating treatment does not require a device that surrounds the workpiece. Therefore, the heating treatment can be performed together with a varnish dropping-infiltrating treatment.

According to another exemplary aspect of the invention, the workpiece can be rotated continuously or reciprocatingly while electric current is being supplied to the workpiece. Therefore, it is possible to perform a varnish-dropping process while a temperature of the workpiece is being maintained at an optimum level by controlling an electric power supply.

According to another exemplary aspect of the invention, because a varnish-infiltrating device is provided, it is possible to implement all kinds of processes of pre-drying, dropping, gelating, and curing, which are contained in a varnish-infiltrating process.

According to another exemplary aspect of the invention, when a slip ring is provided, it is possible to freely set a method of rotating the workpiece and to easily achieve continuous rotation in a rotational direction. When the workpiece is continuously rotated, it is possible to obtain an ideal uniform application of the varnish.

According to another exemplary aspect of the invention, when the workpiece is reciprocatingly rotated, it is possible to apply uniform applications of the varnish at a time of performing a varnish-dropping process and to simplify a pulling condition of electric supply lines.

According to another exemplary aspect of the invention, when the rotator is a reciprocatingly rotating device, it is preferable that electric supply lines from the power supply device are supported by an electric supply line twist-inhibiting mechanism. In this case, it is possible to avoid disturbances of the electric supply lines, disturbances that may occur due to reciprocating rotation of the reciprocating rotating device.

According to another exemplary aspect of the invention, it is preferable that a power supply device that supplies electric power to the wire wound coils is a high-frequency power supply device that supplies high-frequency electric power of which a frequency is higher than a level of a frequency of a commercial power source.

Especially when a workpiece is a stator of a rotary electric machine, it is possible to achieve each effect described above during the varnish-infiltrating process.

The invention claimed is:

1. A rotary electric machine-manufacturing apparatus, comprising:
    a rotator that supports a workpiece attached with wire-wound coils, wherein the rotator rotates the workpiece;
    a power supply device that supplies electric power to the wire-wound coils; and
    a varnish-infiltrating device that supplies varnish to the wire-wound coils, wherein:
        the rotator is a reciprocating rotating device that rotates in a first rotational direction and in an opposite, second rotational direction,
        the varnish-infiltrating device supplies the varnish while the reciprocating rotating device repeats a reciprocating rotation in the first rotational direction and in the second rotational direction,
        the reciprocating rotating device is structured to reciprocatingly repeat rotation at 360 degrees or more in a rotational direction, and
        the varnish-infiltrating device includes a varnish-supplying device at one position for every target portion for applying varnish to the wire-wound coils.

2. The rotary electric machine-manufacturing apparatus according to claim 1, wherein electric supply lines from the power supply device are supported by an electric supply line twist-inhibiting mechanism.

3. A rotary electric machine-manufacturing apparatus, comprising:
    a rotator that supports a workpiece attached with wire-wound coils, wherein the rotator rotates the workpiece;
    a power supply device that supplies electric power to the wire-wound coils; and
    a varnish-infiltrating device that supplies varnish to the wire-wound coils, wherein:
        the rotator is a reciprocating rotating device that rotates in a first rotational direction and in an opposite, second rotational direction,
        the varnish-infiltrating device supplies the varnish while the reciprocating rotating device repeats a reciprocating rotation in the first rotational direction and in the second rotational direction, and
        the reciprocating rotating device is structured to reciprocatingly repeat rotation at a rotational angle within a rotational angle range of between 180 degrees or more and up to less than 360 degrees in a rotational direction, and the varnish-infiltrating device includes two varnish-supplying devices for supplying the varnish that are respectively allocated at positions separated by about 180 degrees to each target portion for applying varnish to the wire-wound coils.

4. The rotary electric machine-manufacturing apparatus according to claim 3, wherein at least one of the varnish-supplying devices is structured to discharge varnish by means of an injector.

5. The rotary electric machine-manufacturing apparatus according to claim 4, wherein at least one of the varnish-supplying devices is structured to supply the varnish by transferring and applying varnish raised by a coater roll.

6. The rotary electric machine-manufacturing apparatus according to claim 3, wherein at least one of the varnish-supplying devices is structured to supply the varnish by transferring and applying varnish raised by a coater roll.

7. A rotary electric machine-manufacturing apparatus, comprising:
    a rotator that supports a workpiece attached with wire-wound coils, wherein the rotator rotates the workpiece:
    a power supply device that supplies electric power to the wire-wound coils: and
    a varnish-infiltrating device that supplies varnish to the wire-wound coils, wherein:
        the rotator is a reciprocating rotating device that rotates in a first rotational direction and in an opposite, second rotational direction,
        the varnish-infiltrating device supplies the varnish while the reciprocating rotating device repeats a reciprocating rotation in the first rotational direction and in the second rotational direction, and
        the reciprocating rotating device is structured to reciprocatingly repeat rotation at a rotational angle within a rotational angle range of between 120 degrees or more and up to less than 180 degrees in a rotational direction, and the varnish-infiltrating device includes three varnish-supplying devices for supplying the varnish that are respectively allocated at positions separated by about 120 degrees to each target portion for applying varnish to the wire-wound coils.

8. The rotary electric machine-manufacturing apparatus according to claim 7, wherein at least one of the varnish-supplying devices is structured to discharge varnish by means of an injector.

9. The rotary electric machine-manufacturing apparatus according to claim 8, wherein at least one of the varnish-supplying devices is structured to supply the varnish by transferring and applying varnish raised by a coater roll.

10. The rotary electric machine-manufacturing apparatus according to claim 7, wherein at least one of the varnish-supplying devices is structured to supply the varnish by transferring and applying varnish raised by a coater roll.

11. A method of manufacturing a rotary electric machine, comprising:
    supporting a workpiece attached with wire-wound coils;
    rotating the workpiece reciprocatingly in a first rotational direction and in an opposite, second rotational direction;
    supplying electric power to the wire-wound coils while the workpiece is being rotated reciprocatingly in the first rotational direction and in the second rotational direction; and
    supplying varnish to the wire-wound coils while electric power is being supplied to the wire-wound coils, the varnish being supplied while the workpiece repeats a reciprocating rotation in the first rotational direction and in the second rotational direction, the reciprocating rotation being performed by reciprocatingly repeating rotation at 360 degrees or more in a rotational direction, and a varnish-supplying device is at one position for every target portion for applying varnish to the wire-wound coils.

12. A method of manufacturing a rotary electric machine, comprising:
supporting a workpiece attached with wire-wound coils;
rotating the workpiece reciprocatingly in a first rotational direction and in an opposite, second rotational direction;
supplying electric power to the wire-wound coils while the workpiece is being rotated reciprocatingly in the first rotational direction and in the second rotational direction; and
supplying varnish to the wire-wound coils while electric power is being supplied to the wire-wound coils, the varnish being supplied while the workpiece repeats a reciprocating rotation in the first rotational direction and in the second rotational direction, and the reciprocating rotation being performed by reciprocatingly repeating rotation at a rotational angle within a rotational angle range of between 180 degrees or more and up to less than 360 degrees in a rotational direction, and a supply of the varnish to the wire-wound coils is performed simultaneously by two varnish-supplying devices for supplying the varnish that are respectively allocated at positions separated by about 180 degrees to each target portion for applying varnish to the wire-wound coils.

13. The method of manufacturing a rotary electric machine according to claim 12, wherein at least one of the varnish-supplying devices is structured to discharge varnish by means of an injector.

14. The method of manufacturing a rotary electric machine according to claim 13, wherein at least one of the varnish-supplying devices is structured to supply the varnish by transferring and applying varnish raised by a coater roll.

15. The method of manufacturing a rotary electric machine according to claim 12, wherein at least one of the varnish-supplying devices is structured to supply the varnish by transferring and applying varnish raised by a coater roll.

16. A method of manufacturing a rotary electric machine, comprising:
supporting a workpiece attached with wire-wound coils;
rotating the workpiece reciprocatingly in a first rotational direction and in an opposite, second rotational direction:
supplying electric power to the wire-wound coils while the workpiece is being rotated reciprocatingly in the first rotational direction and in the second rotational direction; and
supplying varnish to the wire-wound coils while electric power is being supplied to the wire-wound coils, the varnish being supplied while the workpiece repeats a reciprocating rotation in the first rotational direction and in the second rotational direction, and the reciprocating rotation being performed by reciprocatingly repeating rotation at a rotational angle within a rotational angle range of between 120 degrees or more and up to less than 180 degrees in a rotational direction, and a supply of the varnish to the wire-wound coils is performed simultaneously by three varnish-supplying devices for supplying the varnish that are respectively allocated at positions separated by about 120 degrees to each target portion for applying varnish to the wire-wound coils.

17. The method of manufacturing a rotary electric machine according to claim 16, wherein at least one of the varnish-supplying devices is structured to discharge varnish by means of an injector.

18. The method of manufacturing a rotary electric machine according to claim 17, wherein at least one of the varnish-supplying devices is structured to supply the varnish by transferring and applying varnish raised by a coater roll.

19. The method of manufacturing a rotary electric machine according to claim 16, wherein at least one of the varnish-supplying devices is structured to supply the varnish by transferring and applying varnish raised by a coater roll.

* * * * *